United States Patent
Matthews, Jr.

[15] 3,670,513
[45] June 20, 1972

[54] METHOD FOR SUBSURFACE FLOWLINE CONNECTION

[72] Inventor: Jamie F. Matthews, Jr., Houston, Tex.
[73] Assignee: Esso Production Research Company
[22] Filed: Oct. 2, 1970
[21] Appl. No.: 77,463

[52] U.S. Cl. ................................................61/72.3, 166/.6
[51] Int. Cl. ..............................................................F16l 1/00
[58] Field of Search ......................61/72.3, 72.1, 72.5, 72.7; 285/18; 166/.6, .5

[56] References Cited

UNITED STATES PATENTS

| | | | |
|---|---|---|---|
| 3,373,570 | 3/1968 | Hindman | 61/72.3 |
| 3,578,233 | 5/1971 | Meister | 61/72.3 X |

*Primary Examiner*—Jacob Shapiro
*Attorney*—James A. Reilly, John B. Davidson, Lewis H. Eatherton, James E. Gilchrist, Robert L. Graham and James E. Reed

[57] ABSTRACT

A method for constructing an underwater pipeline installation. One section of the pipeline is laid along a line which intersects the longitudinal axis of a second section of the pipeline or other conduit. This second section of the pipeline has a free end which terminates at a point spaced from the intersection of the longitudinal axes of the two sections. The subsurface distance and orientation between the free ends of the two sections is determined and a lateral extension is then secured to the free end of the first section. The lateral extension has a length and orientation such that it will span the subsurface distance and orientation between the two sections. The lateral extension with its attached pipeline section is then lowered and guided into mating relation with the other pipeline section. The lateral extension and the other pipeline section are then connected and the installation is complete. In another embodiment, the method is used to repair or replace a portion of a pipeline.

11 Claims, 3 Drawing Figures

INVENTOR.
JAMIE F. MATTEWS, JR.

BY
Lewis H. Catherton
ATTORNEY

INVENTOR.
JAMIE F. MATTHEWS, JR.

BY
Lewis H. Eatherton
ATTORNEY

INVENTOR.
JAMIE F. MATTHEWS, JR.

BY
Lewis N. Eatherton
ATTORNEY

METHOD FOR SUBSURFACE FLOWLINE CONNECTION

BACKGROUND OF THE INVENTION

1. Description of the Prior Art

One problem which has continually plagued the oil and gas industry is the lack of a simple and reliable method for connecting underwater conduits such as pipelines. Such underwater pipelines are commonly used for the transmission of oil and gas from offshore wells to production and storage facilities on land or to offshore collection terminals.

One conventional method for making such an underwater connection is to lay a pipeline to the other section of line or other facility to which it is to be connected. The line is laid as close as possible along the longitudinal axis of the other section to which it is to be connected and as close as possible to a mating relationship with the other section. Generally, a diver makes a measurement of the axial alignment and distance between the ends of the two sections to be connected. One of the sections is then raised to the surface and an appropriate adjustment in the length of line is made by adding to or cutting off a portion of the line. The line is again lowered to the subsurface location, and a coupling of the two sections is attempted.

Coupling of the two sections by this technique requires a very precise fit. Although axial misalignment of the two sections can be corrected to a certain extent by moving one or both sections transverse to their axes, a gap or overlap between the sections along their axes is extremely difficult to correct. Only a small gap can be tolerated. Where the gap is greater than a matter of inches, the sections cannot be connected without further adjustment. Almost no overlap of the sections can be tolerated. Quite naturally, it may be necessary to raise, adjust, and lower the pipe a number of times before a proper mating of the sections can be attained.

Due to the need for a precision fit of the pipeline sections to be joined, the use of divers is generally required to make an accurate measurement of the alignment and space between the pipeline sections. The technique is, therefore, generally limited to shallow water where divers are able to work.

Moreover, even though the alignment and spacing of the two sections of the line are accurately determined when the sections are on the bottom, subsequent raising and lowering of one section may cause a shift in its location. As a result, after the length of the raised section has been adjusted and that section again lowered to the bottom, there may still be a substantial gap or overlap in the lines. This line shifting, therefore, compounds the difficulties of obtaining a proper mating of the sections of the line.

Another method which has been employed involves the use of an "insert spool." In this method the line which is being laid is laid along the axis of the section with which it is to connect but is purposely laid short of a mating connection. A flange is welded on the free end of each section, and a diver using a "-spool jig" makes a determination of the angular orientation of the two flanges and the distance between them. The jig is then raised to the surface, and a spool which conforms to the jig configuration and dimensions is specially fabricated on the surface. This spool is then lowered to interconnect the sections of the line. A precision fit is required in this method also. The distance between the pipeline sections must be accurately determined, and the spool must be fabricated with care and precision. Thus this method is also generally limited to relatively shallow locations where divers can work with ease and can be quite time-consuming.

Adjustable length, pipeline tie-in equipment has been developed for making such connections. One such device employs a double swivel joint between two pipeline sections with two hydraulic mating actuators with swivel joints at the opposite ends of these sections. The entire assembly is lowered on guide lines to the space between the pipeline sections to be joined. The hydraulic actuators force a connection between the tie-in assembly and the free ends of the pipeline sections. Such a device does not require an extremely precise fit; however, the device can only be adjusted in length within limits. Also the swivel joints may have a relatively short, leak-free service life, particularly in high pressure pipelines. Moreover, due to the complexity of the apparatus, it is relatively expensive.

SUMMARY OF THE INVENTION

This invention relates to a method for connecting sections of underwater pipeline. In one embodiment, the two sections lie at substantially right angles. The free end of one section extends to approximately the longitudinal axis of the other section and is purposely spaced from the free end of the other section along the axis of that section. A lateral extension is affixed to the free end of one section. The lateral extension has a length which is approximately equal to the space between the free ends of the pipeline sections and has an alignment which will be coincident with that of the other pipeline section when lowered to the bottom. The lateral extension and attached section of the pipeline are then lowered to the subsurface location of the pipeline. The free end of the lateral extension is guided into mating relation with the other section during this lowering operation. Due to the angular configuration of the section of pipeline and its lateral extension, freedom of movement of this section along and transverse to its longitudinal axis is permitted to insure ease of alignment with the other pipeline section. This method will permit the joinder of pipeline sections in a simplified manner without the use of expensive joining apparatus. It will permit the joining of pipeline sections at depths where divers are unable to work. It will permit the joinder of large diameter pipelines which cannot be readily joined by the prior art methods. In another embodiment, this method can be used to repair or replace a section of a subsurface pipeline.

These and other objects of the invention will be apparent with reference to the following drawings and the description of the preferred embodiment.

DESCRIPTION OF THE PREFERRED EMBODIMENT

While this invention will be described in terms of connecting a subsurface pipeline to an offshore production platform, it should be obvious that the invention of this application is equally applicable to any subsurface pipeline connection. For example, this method may be used to interconnect two pipelines which have been laid to approximately the same subsurface location. Also, the method can be used to connect a pipeline to a flowline or conduit flange on a subsurface production unit, subsurface gathering system or underwater wellhead. For the sake of uniformity, the conduits to be interconnected will be referred to herein as pipeline sections or conduits. It should be understood, however, such terminology is intended to encompass any conduit capable of transmitting fluids such as a pipeline, a well-head flange, a flow line or a gathering line. Also, as will be described in greater detail, an embodiment of this method can be used to repair or replace a section of pipeline which has ruptured, suffered other damage or otherwise requires repair.

Figure 1:
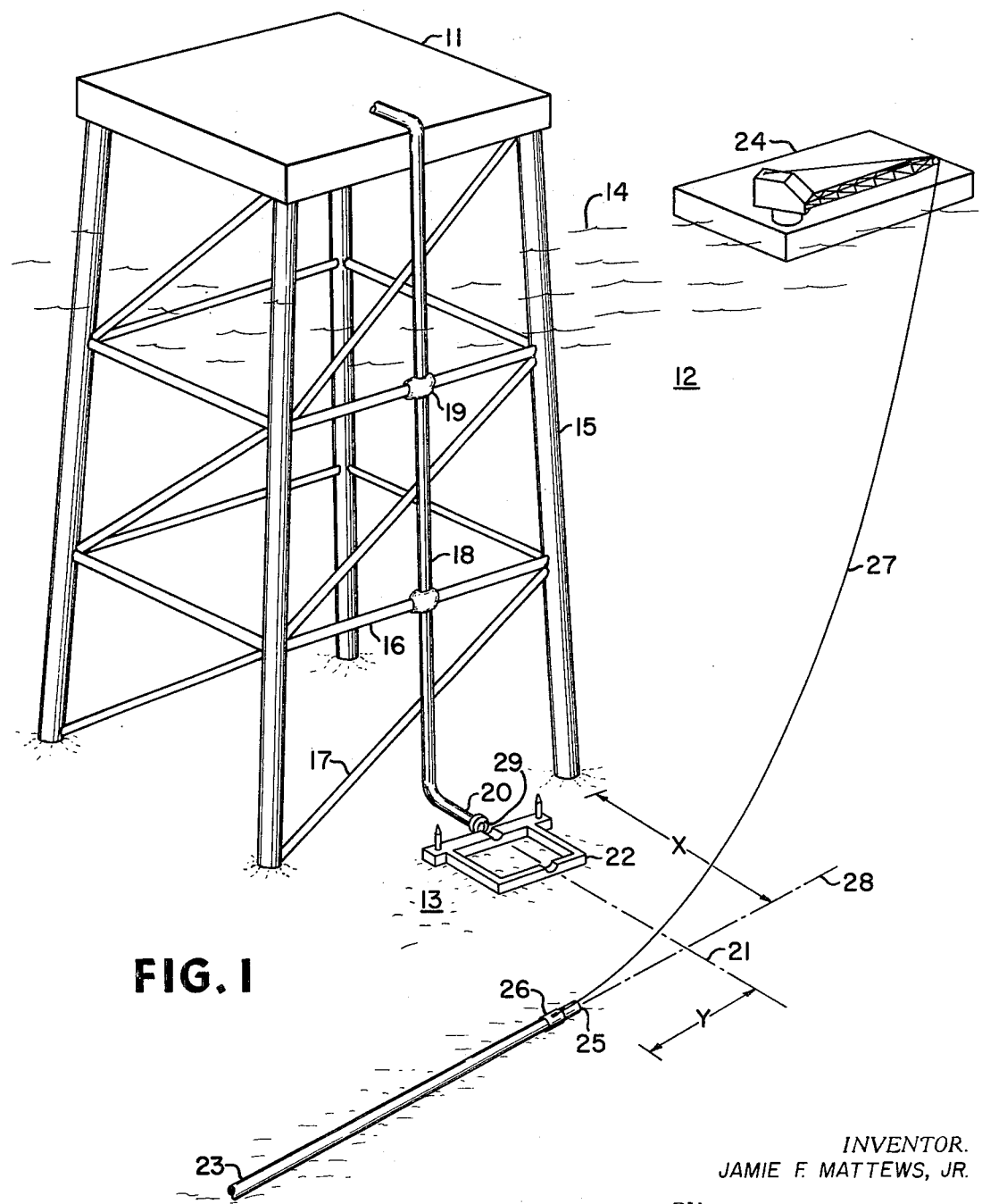
FIG. 1 is a perspective view of an offshore platform showing two sections of a pipeline to be joined.

Referring now to the drawings and particularly to FIG. 1, an offshore production platform is shown generally at 11. The platform lies in a body of water 12 and is supported between the ocean floor 13 and the water surface 14 by support members 15. In the interest of clarity, only a portion of the production platform 11 is shown.

The offshore production platform is strengthened by support members 16 and 17 and has a pipeline riser 18 attached to the support members by clamp means 19. Such a pipeline riser is simply a conduit for transmitting fluids between the ocean floor 13 and the water surface 14. The riser terminates at its lower end in a pipeline section or conduit 20 which is approximately parallel to the ocean floor 13 and approximately horizontal. Conduit 20 has a longitudinal axis 21 which is approximately perpendicular to the longitudinal axis of the riser 18 and is suitably clamped to a connector skid 22 which is affixed to the ocean floor 13. The upper portion of the riser 18 extends to surface facilities such as a production manifold (not shown) on platform 11 or surface separation facilities on the platform (not shown).

As shown in FIG. 1 a pipeline 23 has been laid on the ocean bottom 13 in approximately a horizontal attitude from pipe laying barge 24 by any convenient method. This pipeline has been laid so that its free end 25 comes as close as feasible to the longitudinal axis 21 of the end of the conduit 20. Pipeline 23 is connected to barge 24 by means of a pulling clamp 26 which is attached to a flexible hoist member 27 such as a wire line cable. The pulling clamp 26 is spaced from the free end 25 of pipeline 23 by a sufficient distance to permit removal of a portion of or addition to pipeline 23. In laying pipeline 23, it is aligned so that its longitudinal axis 28 is purposely spaced by a distance X from the end 29 of conduit 20. The purpose of this spacing will be apparent in the following discussion.

With the conduit 20 and the pipeline 23 arranged as shown in FIG. 1, the subsurface distance and orientation between the free end 29 of conduit 20 and the free end 25 of pipeline 23 are then determined. That is, the distance X from the free end 29 of conduit 20 to the intersection of the longitudinal axis 28 of pipeline 23 is determined. Likewise, the distance Y from the free end 25 of pipeline 23 to the intersection of the longitudinal axis 21 of conduit 20 is determined. In the illustration of FIG. 1, pipeline 23 terminates with its free end 25 short of an intersection with the longitudinal axis 21 of conduit 20. It should be understood, however, pipeline 23 may extend to or even beyond longitudinal axis 21. Any excess portion of pipeline 23 can be removed later as will be subsequently discussed.

Figure 2:
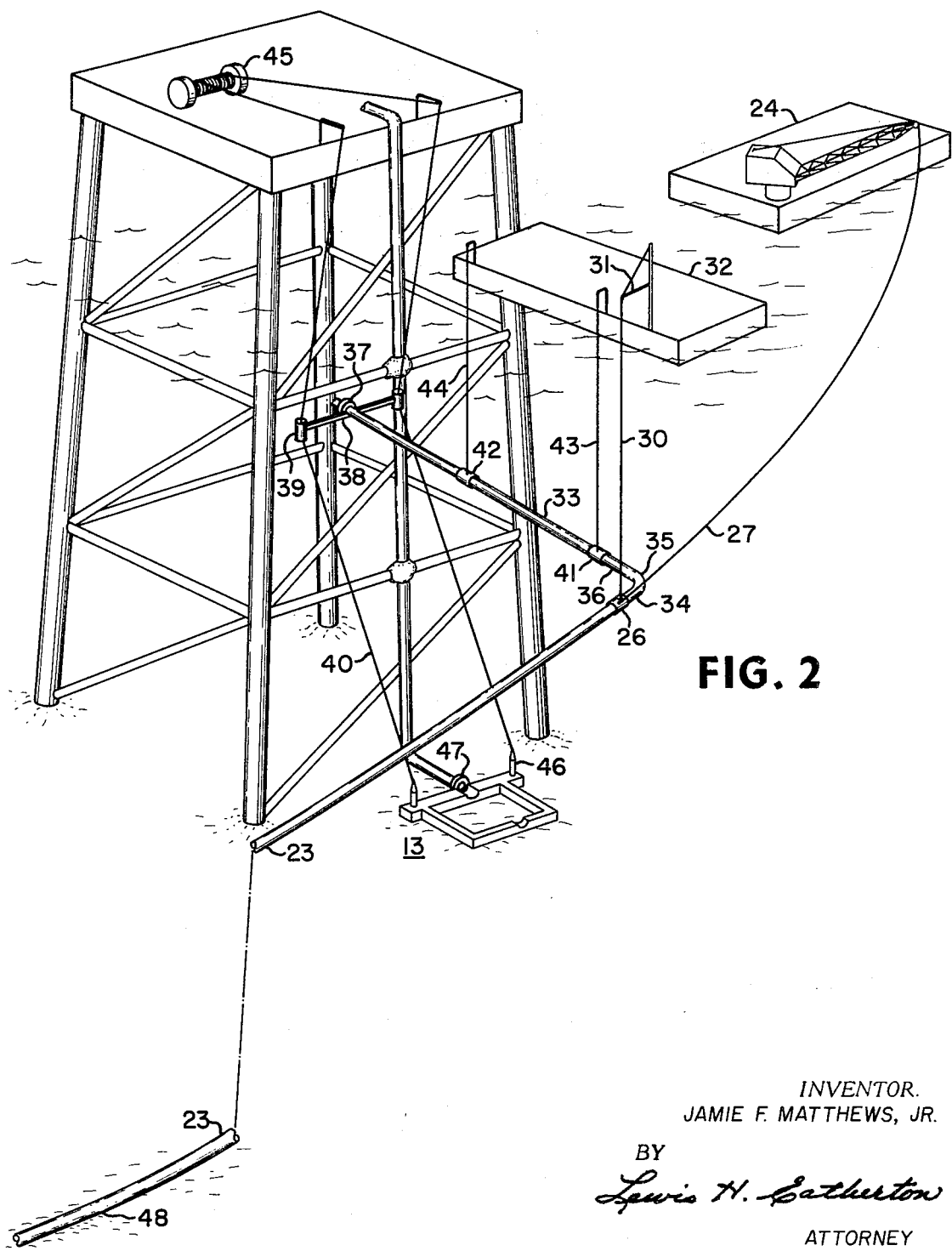
FIG. 2 is a perspective view of the offshore platform illustrating the method of joining a lateral extension to the raised portion of the pipeline and the method of lowering and guiding the raised section and lateral extension to its subsurface location.

The measurement of this subsurface distance and orientation can be made in any convenient manner. For example, in shallow water with good visibility they can be made by divers. In less accessible locations or where water conditions are murky these measurements can be made with conventional sonic apparatus, such as Model 340 High Resolution Scanning Sonar System available from Edo Western Corporation, Salt Lake City, Utah. Also the subsurface distance and orientation can be calculated at the surface. Such a surface measurement can be made after pipeline 23 has been hoisted to the surface. Alternatively, where the pipe is being laid from a barge, the measurement can be made before the pipe is lowered to its subsurface location. Although a surface measurement cannot be made with the same accuracy as the previously described measurement method, it will generally be satisfactory since, as will be described, this method does not require the precision fit of the prior art methods. The inherent flexibility of the method of this invention will correct substantial amounts of axial misalignment and spacing between the ends of the pipeline and the conduit.

Where the subsurface distance and orientation are measured at the subsurface locations of the pipeline and conduit, pipeline 23 is then hoisted to the surface as shown in FIG. 2. Conveniently, this may be done by attaching a hoisting cable 30 to line 23 at the cable clamp 26. Hoisting cable 30 extends through a davit 31 on work barge 32 and is raised and lowered by suitable winching means on the barge (not shown). It is preferred during the hoisting of pipeline 23 to maintain axial tension on cable 27. When the tension in cable 27 is maintained to give an approximately constant horizontal component of force at pulling clamp 26 during the hoisting or lowering operations, the configuration of pipeline 23 will approximate a catenary curve. This configuration will help prevent buckling of pipeline 23 while it is suspended without the necessity for multiple support means along the suspended length of the pipeline. The manner of performing this catenary suspension method is well known to those skilled in the art and need not be discussed in detail herein.

After pipeline 23 has been hoisted to the surface, a lateral extension 33 is secured by conventional means, such as welding, to the free end 25 of pipeline 23. Where a surface measurement has been made of the subsurface distance and orientation prior to lowering the pipeline to its subsurface location, the lateral extension 33 will, of course, be attached to the free end of the pipeline prior to lowering.

The lateral extension which is essentially a pipeline section or conduit has a length and orientation so that it will approximately span the subsurface distance and orientation between the end 25 of the pipeline 23 and the end 29 of the riser 20. In the embodiment shown in FIG. 2, this lateral extension may conveniently consist of a section 34 which with elbow 35 is approximately equal to the distance Y and a central section 36 which with elbow 35 is approximately equal to the distance X. In those instances where the free end 25 of pipeline 23 extends to or beyond longitudinal axis 21, section 34 will be unnecessary and it may, in fact, be desirable to remove any portion of pipeline 23 which extends beyond longitudinal axis 21.

The lateral extension must, of course, have a configuration which will approximately span the distance and orientation between the end 25 of the pipeline and the end 29 of the conduit 20. It is preferred, to employ a lateral extension which is L-shaped with an angle of approximately 90°. Such a configuration can be easily fabricated. More importantly, however, such a configuration will allow ready deflection of the lateral extension which will aid in aligning the lateral extension with the conduit to which it is to be connected. The angle between the pipeline section 23 and the lateral extension 33 may, however, be between 45° and 135° with satisfactory deflectability in most instances.

The spacing of the pipeline from the riser (distance X) and hence the length of a section of the lateral extension may vary considerably. A primary consideration will be the flexibility of the pipe which is a function of its diameter and wall thickness. With more flexible pipe, less spacing will be needed. Other considerations which will govern this spacing include the accuracy with which the distance and orientation can be determined and the size and number of work barges available for raising the extension and pipeline to the surface. The proper spacing in a given instance can be readily determined using conventional engineering techniques and will govern where pipeline 23 is initially laid by barge 24.

This lateral extension, at its opposite end, has a connector hub 37 support member 38 and guide sleeves 39. With the pipeline 23 and lateral extension 33 suspended above the water, guide cables 40 are strung through guide sleeves 39 as shown in FIG. 2. Additional clamps 41 and 42 are placed on the lateral extension 33 and are supported by cables 43 and 44 which are strung through corresponding davits on barge 32.

The pipeline 23 and its lateral extension 33 are than lowered to the ocean floor as shown in FIG. 2 with the lateral extension maintained in approximately a horizontal altitude. Preferably, the guide cables 40 are slacked as shown in FIG. 2 when the pipeline and its lateral extension are initially lowered. During the lowering operation, the tension on the guide cables 40 is increased by guide cable hoisting means 45 and axial tension is maintained on pipeline 23 through cable 27 as previously described. As the pipeline 23 and its lateral extension 33 are lowered to the ocean floor 13, the guide sleeves 39 ride down guide cables 40. When the lowered assembly approaches bottom, the tension on guide cables 40 is increased until they are nearly taut and the guide sleeves 39 engage guide posts 46 on connector skid 22. Connector hub 37 is engaged with corresponding connector hub 47 on the pipeline riser. These hubs can be made up manually by divers where water depth permit or by suitable, remotely operated flowline connectors at deeper depths.

Figure 3:
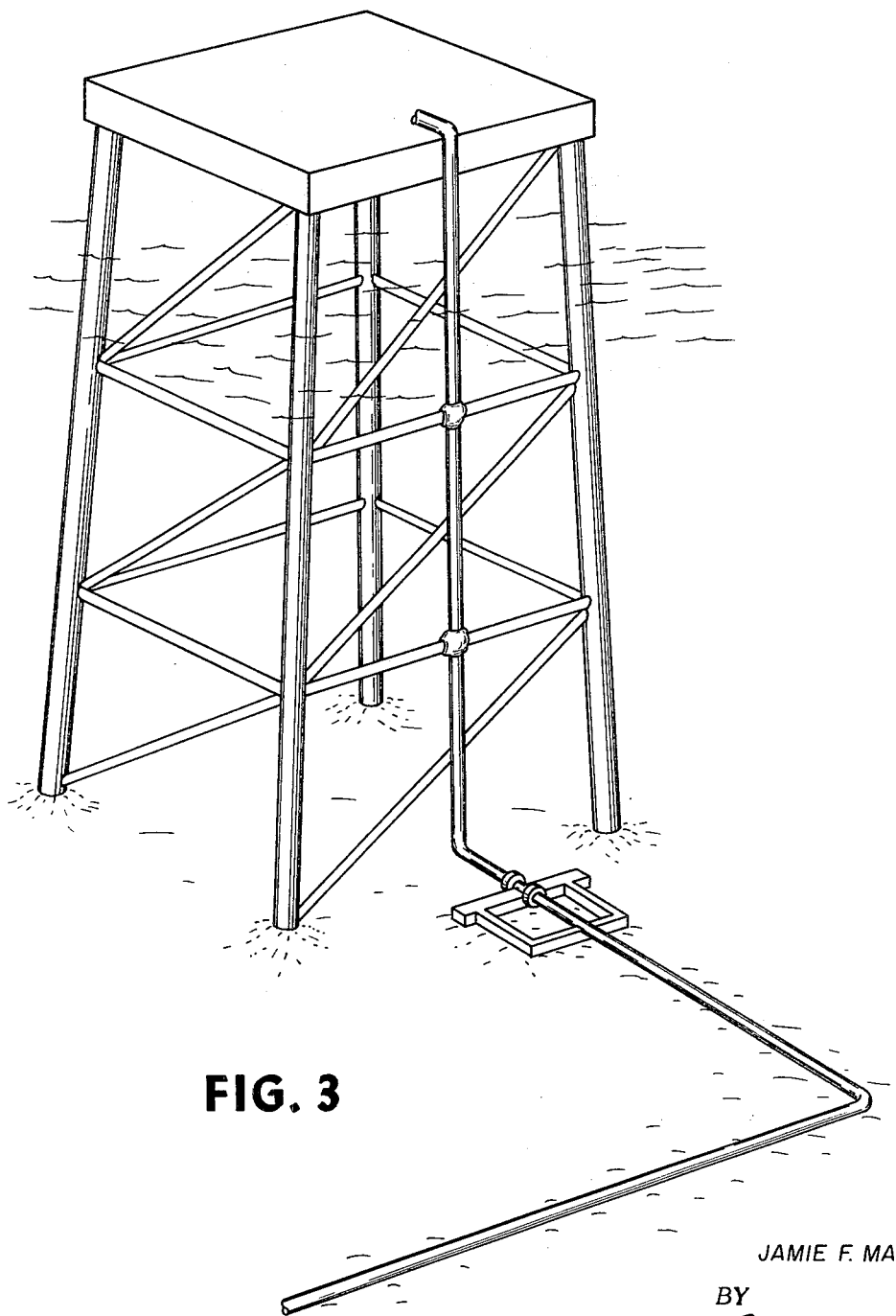
FIG. 3 illustrates the pipeline in its connected position.

As shown in FIG. 3 once the connection between hubs 37 and 47 is complete, the installation is pressure tested. The guide lines are retrieved and the installation is complete.

A principal advantage of this invention can be seen with reference to FIG. 2. In the position shown in this FIGURE pipeline 23 has a point of contact with the ocean floor 13 at 48. Since a portion of pipeline 23 is suspended, a degree of movement transverse to the longitudinal axis of pipeline 23 can be tolerated. This movement will permit alignment along the longitudinal axis 21 of conduit 20. Moreover, movement transverse to the longitudinal axis 21 is permitted by the lateral extension 33. Since this lateral extension is suspended during the lowering operation and is flexible to a certain degree, it will permit adjustment of alignment transverse to longitudinal axis 21. Only a minimal force must be exerted at guide sleeves 39 to accomplish such alignment. This method, therefore, will give a great degree of flexibility to a pipeline section which is to be joined to another; the pipeline section will have freedom of movement both along and transverse to its longitudinal axis. In comparison, the prior art methods give little or no freedom of movement along the longitudinal axis of a pipeline section. It should, thus, be apparent that in the practice of this invention a ready alignment of subsurface pipelines can be made.

As was previously stated, this technique can be used to replace a portion of an existing pipeline, for example, where the pipeline has ruptured. One end of the ruptured line is raised to the surface, a connector hub and connector skid with guide posts and guide lines are attached, and the line is lowered to its original position. The free end of the other section of the ruptured pipeline is raised to the water surface by the catenary suspension method and any damaged portion of the line is replaced. The suspended pipeline is then shifted out of axial alignment with the other section by an amount approximately equal to the desired spacing between the free ends of the pipeline. The desired amount of spacing is calculated using conventional engineering techniques taking into consideration such factors as the pipe size and wall thickness. The suspended section of the pipeline can then be lowered to its displaced position on the ocean floor and the distance and orientation between the ends of the pipeline sections can be determined at the subsurface location. However, surface measurements and calculations will generally be sufficiently accurate due to the alignment flexibility of this method. After the distance and orientation is determined, a lateral extension of appropriate length and orientation is attached to the free end of the suspended section at the surface.

The lateral extension in this embodiment would be approximately Z shaped with a central section having an elbow at each end. One elbow would interconnect the suspended section of the pipeline and the central section of the lateral extension. Due to the angular relation between the suspended section of the pipeline and the other section, the angle of this elbow will generally be less than 90°. This angle will, of course, depend on the general geometry of the system including the angle of the elbow at the opposite end of the central section. As in the earlier discussed embodiment, the suspended section of the pipeline may be lengthened or shortened prior to attaching the elbow and central section. An elbow is also attached to the opposite end of the central section to interconnect the central section and the other section of the pipeline. This elbow will be fitted with a connector hub, support member, and guide sleeves in a manner similar to the previously described embodiment. The lateral extension and suspended section of the pipeline is then lowered as previously described and secured to the mating hub of the other pipeline section.

The principle of the invention and the best mode in which it is contemplated to apply that principle have been described. It is to be understood that the foregoing is illustrative only and that other means and techniques can be employed without departing from the true scope of the invention defined in the following claims.

What is claimed is:

1. A method for connecting a pipeline to an underwater conduit which is at a fixed subsurface location which comprises placing the pipeline along a line which intersects the longitudinal axis of the conduit and which is spaced from a free end of the conduit, determining the subsurface distance and orientation between the free end of the conduit and a free end of the pipeline, attaching to the pipeline a lateral extension having a length and orientation to span approximately the subsurface distance and orientation between the free ends of the pipeline and the conduit, simultaneously lowering and guiding the lateral extension to place the lateral extension in approximate alignment and approximate mating relation with the conduit and connecting the lateral extension to the free end of the conduit.

2. A method as defined by claim 1 in which one end of the pipeline is at a surface location during the placement of the pipeline along a line which intersects the longitudinal axis of the conduit and which is spaced from a free end of the conduit.

3. A method as defined by claim 1 in which the pipeline is at a subsurface location and raised from the subsurface location prior to attaching the lateral extension.

4. A method as defined by claim 3 further comprising applying axial tension to the pipeline during the raising of the pipeline and the lowering of the lateral extension.

5. A method as defined by claim 4 wherein the horizontal component of the axial tension is approximately constant during the raising of the pipeline and the lowering of the lateral extension.

6. A method as defined by claim 1 wherein the lateral extension is maintained in substantially a horizontal position during the lowering of the lateral extension.

7. A method as defined by claim 1 wherein the subsurface distance and orientation between the free ends of the pipeline and the conduit are determined at their subsurface locations.

8. A method as defined by claim 1 wherein the subsurface distance and orientation between the free ends of the pipeline and conduit are determined when the pipeline is at a surface location.

9. A method as defined by claim 1 further comprising applying axial tension to the pipeline during the lowering of the lateral extension.

10. A method as defined by claim 9 wherein the horizontal component of the axial tension is approximately constant during the lowering of the lateral extension.

11. A method for replacing a portion of an underwater conduit which comprises raising a free end of a first section of the conduit from a subsurface location, shifting the free end of the first section in a direction transverse to its longitudinal axis, then determining the subsurface distance and orientation between the free end of the first section and a free end of a second section which is at a fixed subsurface location, attaching a lateral extension to the first section which has a length and orientation which will approximately span the subsurface distance and orientation between the first and second sections, lowering the lateral extension and the first section, guiding the lateral extension into mating relationship with the second second, and connecting the lateral extension and second section.

* * * * *